United States Patent Office 2,856,308
Patented Oct. 14, 1958

2,856,308

ADHESIVITY OF BITUMINOUS BINDERS

Jean Suprin, Jean-Baptiste Signouret, and Robert Tirtiaux, Notre-Dame de Gravenchon, France, assignors to Esso Standard Societe Anonyme Francaise, Paris, France, a body corporate No Drawing. Application January 26, 1956
Serial No. 561,667

Claims priority, application France February 3, 1955

5 Claims. (Cl. 106—273)

This invention relates to a method of improving the adhesivity of bituminous binders such as bitumens, asphalts and tars.

In particular this invention relates to a method of obtaining bituminous compositions of good adhesivity which retain that good adhesivity after being subjected to prolonged heating.

Bituminous binders such as are used for the construction of road surfaces and airfield runways and the like must be highly viscous. They should not be so hard as to be brittle under cold weather conditions, but on the other hand they must not soften unduly in hot weather or flow excessively under heavy traffic.

Such bituminous binders cannot be laid cold at such viscosities and it is common practice to heat them to such a temperature that they can easily be poured onto the road or other surfaces.

A number of substances have been proposed for use as adhesivity agents to improve the adhesivity of the bituminous binder to the aggregate onto which the bitumen is laid or with which the bitumen is mixed but the substances so far proposed have not been very heat stable and in heating up the bitumen for pouring the adhesivity agents have tended to lose their activity.

It has now been found that the products obtained by condensing an amine with an alkylene oxide are not only good adhesivity agents for bituminous binders, but allow bitumens to which they have been added to retain good adhesive properties after prolonged heating.

Accordingly, the present invention comprises a method of improving the adhesivity of bituminous binders which comprises adding to the bituminous binders between 0.01 and 10% by weight of a product obtained by condensing an amine with an alkylene oxide.

Condensation products of this type allow good adhesivity to any types of aggregate whether calcareous or siliceous for example on silica chips, quartzite, porphyry, granite, calcite, dolomite or flint.

The amine which is to be condensed with the alkylene oxide may be a primary, secondary or tertiary amine and may be aliphatic or aromatic or it may be a compound having one or more amine functions derived from the condensation of a fatty acid with a polyamine.

Preferably however, the amine is an aliphatic primary amine such as dodecylamine.

The inventors of this application have discovered that the condensation of an amine with an alkylene oxide has the effect of protecting the amine function against the action of heat. For this protection to be at its maximum there should be condensed with the amine at least as many molecules of the alkylene oxide as there are active hydrogen atoms in the amine used, for if the alkylene oxide is fixed only on some of the active hydrogen atoms the adhesive properties of the bituminous composition to which the condensation product is added, decrease under the action of prolonged heating.

It has further been found that a slight excess of alkylene oxide over the amount required to fix onto all the active hydrogen atoms of the amine is not as a rule harmful to the properties of the condensation product except that it should be borne in mind that too large an excess of the alkylene oxide will increase the molecular weight to a point where its low solubility in the bitumen renders it less able to be effective as an adhesivity agent. When the amine used is a primary aliphatic amine, it is preferred to condense it with from 1 to 3 molecular proportions of an alkylene oxide. It is particularly preferred to condense a primary aliphatic amine with about two molecular proportions of an alkylene oxide.

The alkylene oxide to be used may be ethylene oxide or propylene oxide, but in general ethylene oxide is preferred for the purpose of this invention.

The amount of the ethoxylated amine which is to be added to the bituminous binder should be between 0.01 and 10% by weight of the weight of bitumen and it is generally preferred to use amounts between 0.1 and 2.0% by weight of the bitumen.

In order to illustrate the invention, comparative experiments were conducted to show the effect on the adhesivity of a bitumen of incorporating an amine and incorporating a condensation product of the same amine and ethylene oxide in various proportions. The adhesivity of the bitumen was then recovered before heating and after heating for 30 hours at 150° C.

The experiments were conducted as follows:

1% by weight of the additive was added to a fluid cutback of viscosity 370 centistokes (B. R. T. A. o/1 at 25° C.) and 4 grams of the bituminous composition so formed were mixed with 150 grams of a slightly wet silex (flint). After mixing for three minutes there was added 8 grams of a non-activated cutback of viscosity between 58,500 and 78,000 centistokes (between 150 and 200 B. R. T. A. at 25° C.) and the mixture was heated for a few moments at 80° C. to homogenise the mixture and was then mixed again for a further five minutes.

The mixture was then plunged into water and after being immersed for a period of 24 hours, the percentage of the flint that was coated with the bitumen was measured.

Other samples were heated for 30 hours at 150° C. before being immersed in water for 24 hours and the results are shown below in tabulated form

| Nature of activator | Percentage of material covered—Activated Cutback | |
|---|---|---|
| | Unheated | Heated 30 h. at 150° C. |
| Dodecylamine | 95/100 | 40 |
| Dodecylamine condensed with 1.2 moles ethylene oxide | 80/90 | 30/40 |
| Dodecylamine condensed with 1.5 moles ethylene oxide | 90/95 | 70 |
| Dodecylamine condensed with 1.9 moles ethylene oxide | 100 | 98 |
| Dodecylamine condensed with 2.1 moles ethylene oxide | 90/95 | 90/95 |

It will be seen that the amine/ethylene oxide condensation products gave better adhesivity after heating than the amine alone. The exceptionally good heat stability afforded by the amine condensed with about 2 molecular proportions of the ethylene oxide will be noted.

It will be appreciated that this invention has been particularly described by way of illustration and that modification within the scope of the appended claims may be made.

What we claim is:

1. A method of improving the adhesivity of bituminous binders which comprises adding to the bituminous binders between 0.01 and 10% by weight of a product obtained by condensing a dodecyl amine with 1 to 3 molecular proportions of a lower alkylene oxide.

2. A method according to claim 1 wherein the alkylene oxide is ethylene oxide.

3. A method according to claim 1 wherein the amount of the amine-alkylene oxide condensation product added to the bituminous binder is between 0.1 and 2% by weight of the weight of the binder.

4. A composition of matter comprising a bitumen, and between 0.01 and 10% by weight of the condensation product of a primary dodecyl amine with 1 to 3 molecular proportions of a lower alkylene oxide.

5. A composition of matter consisting essentially of a bitumen and from 0.1 to 2% by weight of the condensation product of dodecyl amine and about 2 mols of ethylene oxide.

References Cited in the file of this patent

UNITED STATES PATENTS 2,689,263  Schmidle _____ Sept. 14, 1954

FOREIGN PATENTS 130,484  Australia _____ Dec. 6, 1948